United States Patent
Alshatwi et al.

(10) Patent No.: US 11,006,659 B2
(45) Date of Patent: May 18, 2021

(54) FORTIFIED DATE FRUIT PRODUCT

(71) Applicant: KING SAUD UNIVERSITY, Riyadh (SA)

(72) Inventors: Ali Abdullah Alshatwi, Riyadh (SA); Jegan Athinarayanan, Riyadh (SA); Periasamy Vaiyapuri Subbarayan, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 459 days.

(21) Appl. No.: 16/106,648

(22) Filed: Aug. 21, 2018

(65) Prior Publication Data

US 2019/0090526 A1  Mar. 28, 2019

Related U.S. Application Data

(62) Division of application No. 15/715,797, filed on Sep. 26, 2017, now abandoned.

(51) Int. Cl.
| | |
|---|---|
| *A23L 33/105* | (2016.01) |
| *A23L 33/16* | (2016.01) |
| *C13B 50/00* | (2011.01) |
| *C13B 10/02* | (2011.01) |
| *A23L 29/30* | (2016.01) |

(52) U.S. Cl.
CPC ............ *A23L 33/105* (2016.08); *A23L 29/30* (2016.08); *A23L 33/16* (2016.08); *C13B 10/02* (2013.01); *C13B 50/002* (2013.01); *A23V 2002/00* (2013.01); *A23V 2300/50* (2013.01)

(58) Field of Classification Search
CPC .................... A23L 33/16; A23L 33/105
See application file for complete search history.

(56) References Cited

U.S. PATENT DOCUMENTS

| | | | |
|---|---|---|---|
| 9,259,025 B2 | 2/2016 | Diguet et al. | |
| 2008/0160086 A1 * | 7/2008 | Farber | A23K 20/174 424/488 |
| 2009/0263497 A1 * | 10/2009 | Brito Lopes | B82Y 30/00 424/602 |
| 2011/0195170 A1 | 8/2011 | Shigemura et al. | |
| 2016/0007630 A1 | 1/2016 | Parks | |
| 2016/0185727 A1 | 6/2016 | Petrovic et al. | |

FOREIGN PATENT DOCUMENTS

| | | | | |
|---|---|---|---|---|
| CN | 101759169 A | * | 1/2013 | ............ C01B 25/32 |
| CN | 103109967 A | | 5/2013 | |

OTHER PUBLICATIONS

Machine translation and Derwent Abstract for CN101759169. Publication date Jan. 16, 2013. pp. 1-5. (Year: 2013).*

Any identified foreign patents and/or publications were properly filed in parent U.S. Appl. No. 15/715,797, filed Sep. 26, 2017, the priority of which is claimed.

* cited by examiner

*Primary Examiner* — Jenna A Watts
(74) *Attorney, Agent, or Firm* — Nath, Goldberg & Meyer; Richard C. Litman

(57) ABSTRACT

A fortified date fruit product includes date fruit sugar and one or more mineral phosphate nanostructures. The mineral phosphate nanostructures can be selected from one or more of calcium phosphate, zinc phosphate, and iron phosphate nanostructures, among others. The mineral phosphate nanostructures can have a particle size ranging from about 5 nm to about 100 nm, e.g., about 5 nm to about 20 nm, about 50 nm to about 100 nm, and about 75 nm to about 100 nm.

2 Claims, 5 Drawing Sheets

US 11,006,659 B2

FORTIFIED DATE FRUIT PRODUCT

CROSS REFERENCE TO RELATED APPLICATIONS

This application is a divisional application of Ser. No. 15/715,797, filed Sep. 26, 2017.

BACKGROUND OF THE INVENTION

1. Field of the Invention

The present subject matter relates to fortified food products, and particularly to food products including fortified date fruit sugar for use as a nutritional supplement.

BACKGROUND

Malnutrition is a growing problem that affects more than 50% of the world's population, particularly in developing and under-developing countries. Annually, around 3.7 million deaths worldwide are attributed to severe malnutrition.

Minerals are nutrients that are essential for maintaining normal bodily function and general health. Malnutrition of essential minerals for human health—such as iron, zinc, selenium, calcium, and vitamin A, among others—has received increased attention from governments and world health organizations including WHO—the World Health Organization. One-third of the world's population is thought to have some type of mineral deficiency.

Specifically, humans need different quantities of different minerals to maintain good health. Mineral deficiencies can be caused by numerous factors, such as a lack of sufficient minerals in a healthy diet, increased need of certain minerals, or difficulty absorbing minerals from food. Mineral deficiencies can cause health problems. Specifically, for example, deficiencies in iron, zinc, or calcium cause various health issues.

Calcium is an important mineral essential for maintaining healthy blood pressure, strong bones, and tooth enamel strength. Calcium deficiencies can cause various illnesses or conditions in humans, including memory loss, muscle cramps, numbness and tingling, depression, weak and brittle nails, osteoporosis, osteopenia, and hypocalcemia.

Iron is another mineral essential for human health. Iron deficiency may lead to anemia in some individuals. Moreover, iron deficiency increases various health risks and conditions including extreme fatigue, tongue soreness, body weakness, pale skin, chest pain, headache, dizziness, inflammation, and brittle nails.

Zinc is yet another essential mineral for maintaining healthy physiological function. For example, zinc plays a vital role in skeletal development, skin growth, reproduction, appetite, wound healing, immune system development, antioxidant function, and growth.

Mineral deficiencies can be prevented by nutrient supplementation and fortification. According to the UN Food & Agriculture Organization (FAO) and WHO, food fortification is characterized as adding an essential mineral in specific food products, to prevent or correct a mineral deficiency in a population. Generally, various kinds of foods are fortified such as milk and milk products, sugar, rice, flour, salt, cereals, fats, and oils. Nanotechnology-based food fortification is an efficient and economical method that has received great attention in the efforts to prevent and treat or control micronutrient and mineral malnutrition.

Date palm (*Phoenix dactyliferous*) is a tree that commonly grows in Arab countries. Globally, Gulf countries produce approximately 50% of dates worldwide, as reported by FAO. Remarkably, the Kingdom of Saudi Arabia (KSA) is a very large date fruit producer. According to the Ministry of Agriculture, approximately 25 million date palm trees grow on 157,000 hectares in the KSA, producing around 1.1 million tons of date fruits per year.

Date fruits contain sugars, fats, minerals, proteins, amino acids, and vitamins. Interestingly, date fruits contain a very high content of sugar (45-70%). Commonly, date fruits are considered to be a nutritional food that provides essential nutrients and promotes overall human health. Additionally, date fruits are highly suitable for food fortification. Thus, a mineral phosphate fortified, date fruit sugar nutritional supplement solving the aforementioned problems is desired.

SUMMARY

One embodiment of the present subject matter provides a fortified date fruit product including date fruit sugar and one or more mineral phosphate nanostructures. The mineral phosphates can be selected from one or more of calcium phosphate, zinc phosphate, and iron phosphate, among others. The mineral phosphate nanostructures can have a particle size ranging from about 5 nm to about 100 nm, e.g., about 5 nm to about 20 nm, about 50 nm to about 100 nm, and about 75 nm to about 100 nm.

A method of producing a fortified date fruit product is provided. The method includes deriving date fruit sugar syrup from date fruits; synthesizing one or more mineral phosphate nanostructures; and fortifying the date fruit sugar syrup with the one or more mineral phosphate nanostructures. The fortified date fruit product can be in the form, for example, of a food or diet supplement.

These and other features of the present disclosure will become readily apparent upon further review of the following specification and drawings.

BRIEF DESCRIPTION OF THE DRAWINGS

The drawings and detailed description which follow are intended to be merely illustrative of the exemplary embodiments and are not intended to limit the scope of the invention as set forth in the claims.

DETAILED DESCRIPTION

Figure 1:
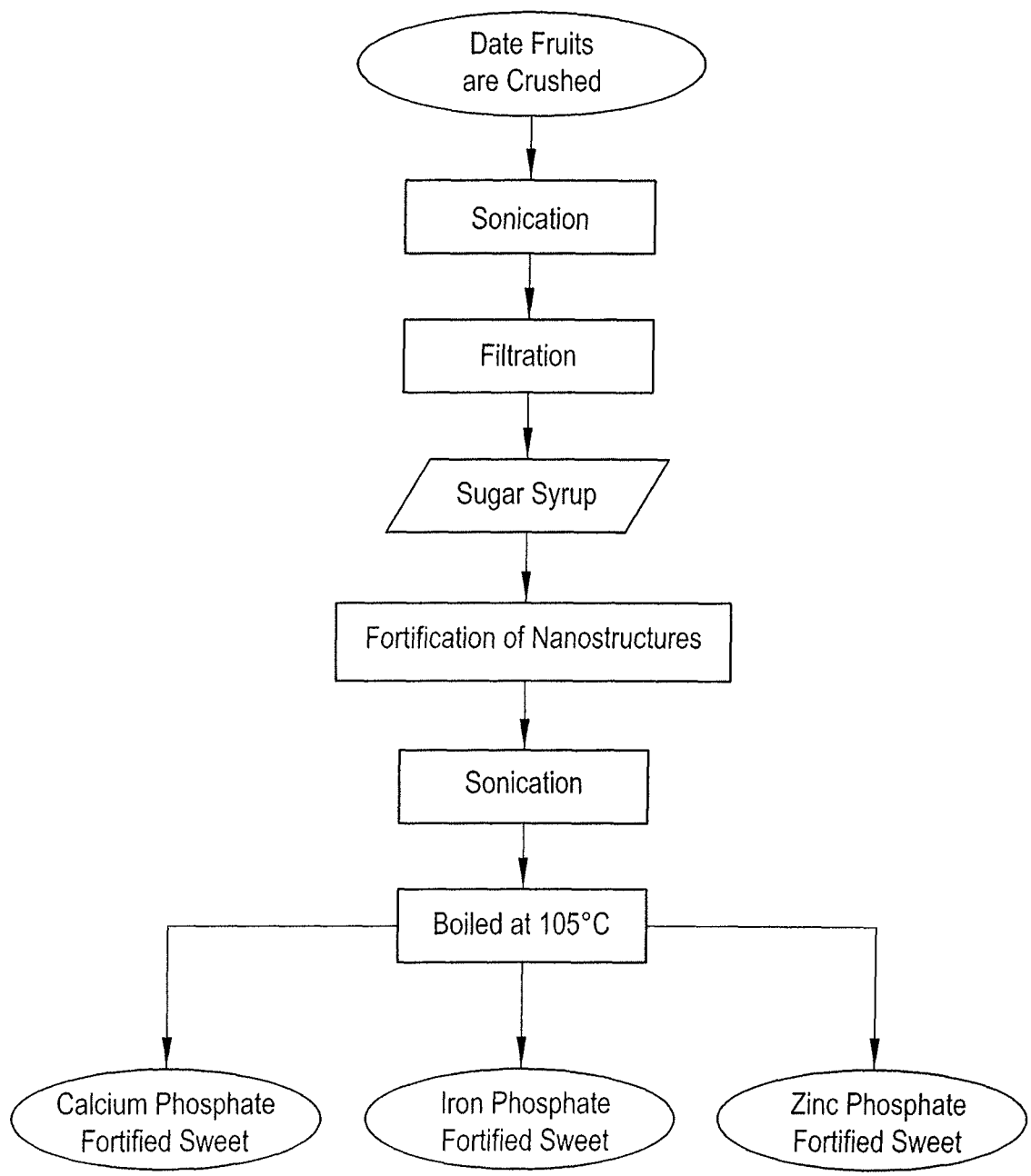
FIG. 1 is a flowchart of a method for preparing date fruit sugar syrup fortified with mineral phosphate.

The present subject matter is directed to a fortified date fruit product. The fortified date fruit product includes date fruit sugar and one or more mineral phosphate nanostructures. A method for producing the fortified date fruit product can include preparing mineral phosphate nanostructures and mixing the mineral phosphate nanostructures with a date fruit sugar syrup. The mineral phosphate nanostructures can include, for example, nanostructures of iron phosphate, zinc phosphate, and calcium phosphate. The calcium phosphate nanostructures can have a particle size ranging from about 50 nm to about 100 nm. The iron phosphate nanostructures can have a particle size ranging from about 75 nm to about 100 nm. The zinc phosphate nanostructures can have a particle size ranging from about 5 nm to about 20 nm.

The fortified date fruit product can be useful in a variety of applications, including, for example, as a dietary supplement to provide nutrients and minerals for maintaining or helping to maintain healthy bodily function, and for preventing or helping to prevent malnutrition. In one embodiment, a nutritional supplement is provided that includes the fortified date fruit product. The supplement is intended for administration to a human, although it can be administered to an animal, if warranted. The supplement may also include one or more vitamins, one or more other minerals or mineral salts, or some combination of these nutrients. By way of example, the supplement can include enough of a mineral phosphate that it provides a daily recommended dose of the mineral phosphate.

The dosages of calcium phosphate, zinc phosphate and iron phosphate in the fortified date fruit product can be equivalent to the Recommended Daily Intake level according to various regulatory bodies, for example, the Federal Food and Drug Administration (FDA). The calcium, zinc, and iron sources are substantially tasteless and do not adversely affect the texture or flavor of the fortified date fruit product.

Normally, the recommended daily allowances of calcium, iron and zinc (Ca=500-1000 mg; Fe=4-59 mg; Zn=5-12 mg) vary based on a person's age, health, etc. An exemplary fortified date fruit product including calcium phosphate, zinc phosphate and iron phosphate can be suitable for use in treating calcium, zinc and iron deficiencies. The fortified date fruit product can improve human health and prevent or reduce malnutrition by providing at least some essential nutrients.

The method of producing a fortified date fruit product can include the step of deriving date fruit sugar syrup from date fruits. In some embodiments, the date fruit sugar syrup is derived by adding water to the date fruits, crushing the date fruits in the water to form a crushed date fruit solution, sonicating the crushed date fruit solution, and filtering the sonicated solution to obtain date fruit sugar syrup.

The date fruit sugar syrup can be mixed with one or more mineral phosphate nanostructures to form a mixture; the mixture can be boiled gently and then dried. Preferably, the date fruit sugar syrup is fortified with mineral phosphates in an amount or concentration based on recommended daily allowances of minerals according to the FDA or other regulatory body.

The mineral phosphate nanostructures can include at least one of calcium phosphate nanostructures, zinc phosphate nanostructures, and iron phosphate nanostructures. The mineral phosphate nanostructures can be synthesized by adding a disodium phosphate solution dropwise to a mineral chloride solution with stirring to form a mixture; keeping the mixture in an autoclave for a period of time to form a reaction mixture; and centrifuging the reaction mixture to obtain the mineral phosphate nanostructure. The mineral chloride solution can be, for example, calcium chloride, zinc chloride, or iron chloride, in order to synthesize calcium phosphate, zinc phosphate, or iron phosphate, respectively. Each of the mineral phosphate nanostructures typically are synthesized separately. Each nanostructure preparation may be used in crystalline and/or amorphous forms.

The fortified date fruit product can be administered to a patient in the form of a supplement. Common delivery formats and methods are contemplated to be used to deliver the fortified date fruit product to a patient in need thereof. It is also contemplated that the fortified date fruit product can be fortified with other vitamins and/or minerals not discussed herein.

The nanoscale particle size of the minerals can enhance and facilitate their absorption when used as nutritional supplements and fortified foods. Interestingly, the bioavailability of the synthesized nanostructures were higher than the bioavailability of metal ions. In this respect, one or more servings of the synthesized calcium phosphate, zinc phosphate and iron phosphate fortified date product ideally is prepared to include the Recommended Daily Intake level of each particular mineral, using sonication.

The following examples illustrate the present teachings.

Example 1

Synthesis of Mineral Phosphate Nanostructures

A 0.01 M solution (approximately 100 mL) was prepared for each mineral chloride (e.g., calcium chloride, iron chloride, and zinc chloride), in separate conical flasks. Then, 0.02 M disodium hydrogen phosphate solution (100 mL) was added dropwise to each of the mineral chloride solutions under constant stirring. Next, each mixture was kept separately in an autoclave at 120° C. for 2 hours, to facilitate the reaction. After this reaction, each of the resulting materials was washed with distilled water, using centrifugation to isolate the powder form. The obtained powders were evaluated for further characterization and subject to fortification. The structure and morphology of the resulting nanostructures were analyzed using TEM. The crystalline properties of the prepared nanostructures were investigated using XRD.

Example 2

Extraction of Date Sugar and Fortification Thereof

Date palm fruits were collected from date farms in Riyadh, Saudi Arabia. The zinc chloride, iron chloride, and calcium chloride were purchased from Sigma-Aldrich®.

FIG. 1 shows a flowchart of a method for preparing fortified date fruit product. First, the collected date fruits were crushed and mixed with drinking water, and the mixture was sonicated for approximately 15 minutes. The date fruit sugar from the mixture was then filtered after the sonication. The resulting date fruit sugar syrup was used for the fortification process.

The synthesized nanostructures, e.g., calcium phosphate, iron phosphate, and zinc phosphate nanostructures, were mixed with date fruit sugar syrup. The amount of mineral phosphates mixed with date fruit sugar syrup was based on the recommended daily allowances for the respective minerals. Subsequently, the date fruit sugar syrup and nanostructures were boiled together at 105° C. until a brown, semi-solid cake formation was observed. Afterwards, the semi-solid was poured onto a plate and dried to provide the fortified date fruit product.

Example 3

Physio-Chemical Properties of the Mineral Phosphate Nanostructures

Figure 2:
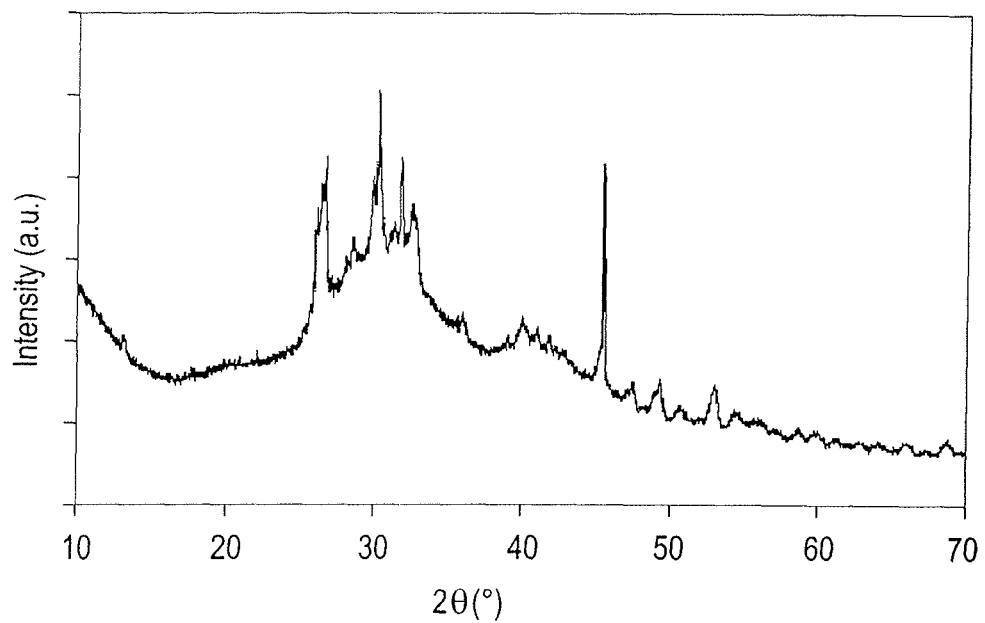
FIG. 2 is an X-Ray Diffraction (XRD) pattern of synthesized calcium phosphate nanocrystals.

FIG. 2 shows the crystalline phases of the synthesized calcium nanocrystals that were identified using XRD. The synthesized calcium phosphate exhibited XRD peaks at 2θ values of 25.9, 28.36, 30.13, 31.66, 31.78, 39.8, 46.8, 49.44, and 52.9, which corresponds to planes (130), (211), (–103), (221), (–132), (310), (203), (213) and (004), respectively. The XRD results confirmed the formation of calcium phosphate nanocrystals.

Figure 3:
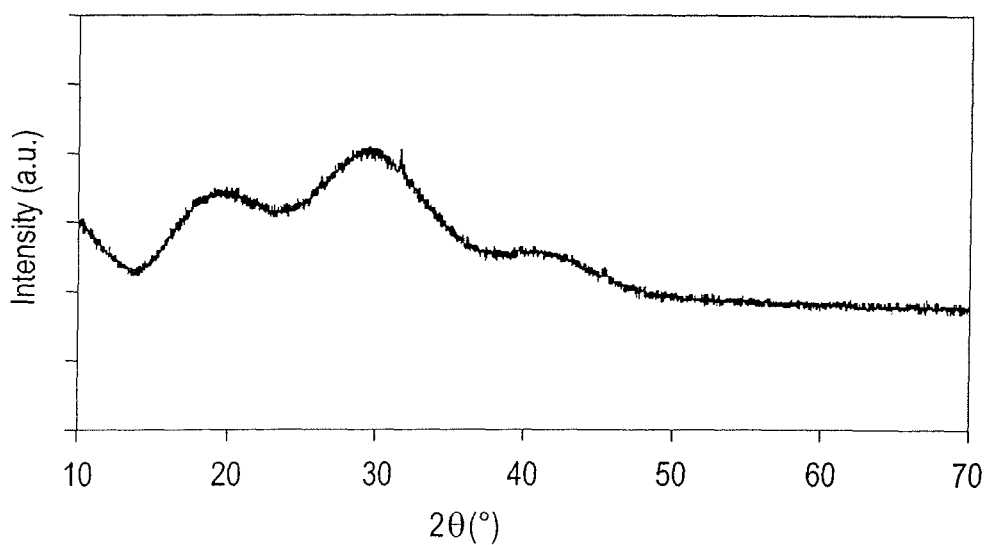
FIG. 3 is an XRD pattern of synthesized iron phosphate nanoparticles.

FIG. 3 shows the XRD pattern of the synthesized iron phosphate nanoparticles. A broad peak was observed between 20°-30°. The XRD results suggested that the synthesized iron phosphate nanoparticles have an amorphous structure.

Figure 4:
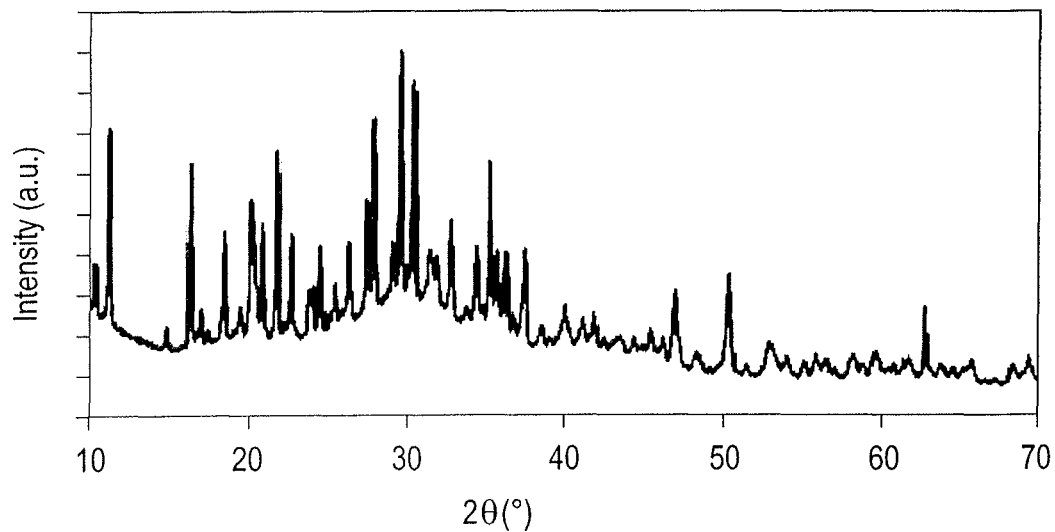
FIG. 4 is an XRD pattern of synthesized zinc phosphate nanoparticles.

The XRD pattern of the synthesized zinc phosphate nanoparticles are shown in FIG. 4. The zinc phosphate exhibited peaks at 2θ=14.74 (102), 16.25, 16.39 (200), 18.41 (210), 19.48 (011), 20.025, 20.1 (111), 21.676, 22.533 (040), 23.6 (121), 24.47 (031), 24.53, 26.14 (221), 27.7, 29.4 (014), 30.31 (051), 30.48 (241), 32.68 (212), 34.255 (321), 35.13 (002), 35.56 (161), 37.37 (022), 39.8 (171), 41.02 (431), 46.83 (371), 50.2 (402), 52.7 (620) and 62.5 (303). The diffraction peaks of prepared zinc phosphate matched with the standard data of zinc phosphate ($Zn_3(PO_4)_2$) (JCPDS 33-1474, 37-0316 and 37-0465). These results confirmed the formation of zinc phosphate nanocrystals.

Figure 5A:
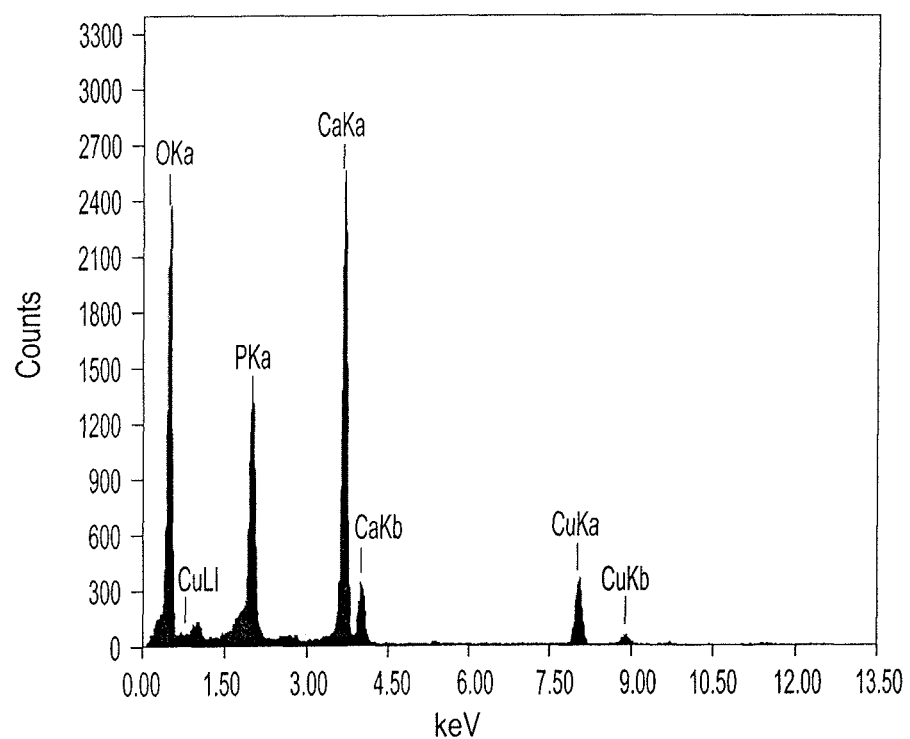
FIG. 5A shows Energy-dispersive X-ray spectroscopy (EDX) of calcium phosphate nanostructures.
Figure 5B:
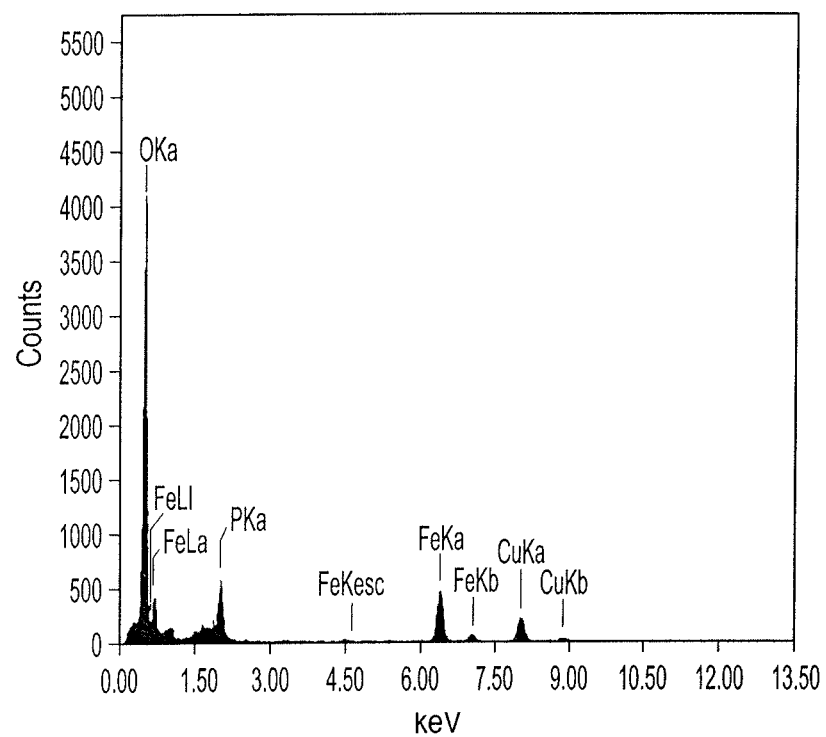
FIG. 5B shows Energy-dispersive X-ray spectroscopy (EDX) of iron phosphate nanostructures.
Figure 5C:
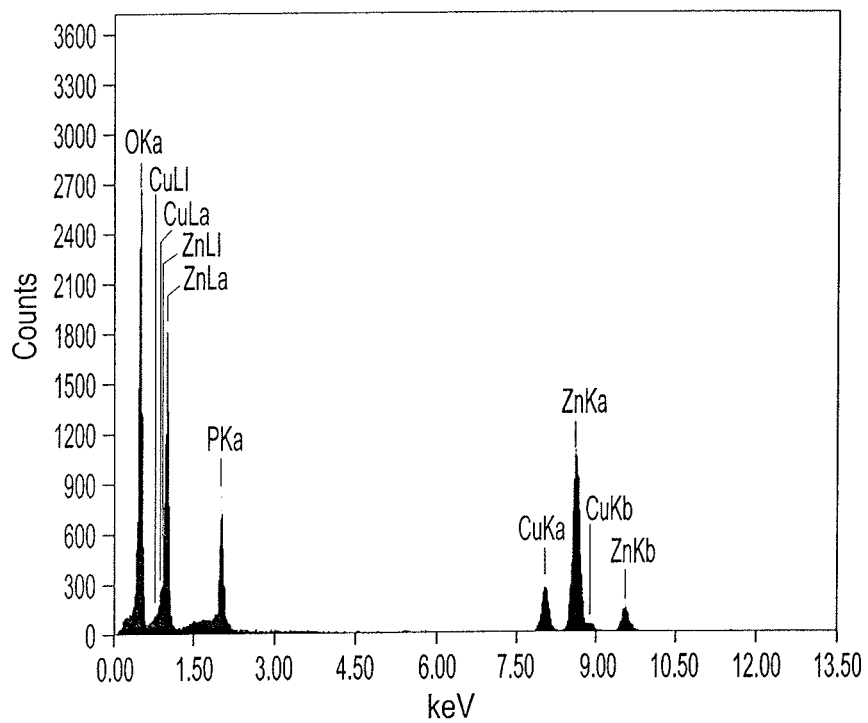
FIG. 5C shows Energy-dispersive X-ray spectroscopy (EDX) of zinc phosphate nanostructures.

FIGS. 5A, 5B, and 5C show EDX analysis of the synthesized mineral phosphate nanostructures. FIG. 5A shows the peaks for Ca, P, O, and Cu elements, wherein the Ca, P, and O elements correspond to calcium phosphate nanocrystals and Cu corresponds to the copper grid for TEM analysis. FIG. 5B shows the peaks for Fe, P, O, and Cu elements. The Fe, P, and O peaks are attributed to amorphous iron phosphate. The EDX of the zinc phosphate nanoparticles are shown in FIG. 5C, which shows the presence of Zn, P, O, and Cu elements. The Zn, O, and P correspond to zinc phosphate nanoparticles. As such, the EDX results indicate that synthesized mineral phosphates of the present subject matter are highly pure.

Figure 6A:
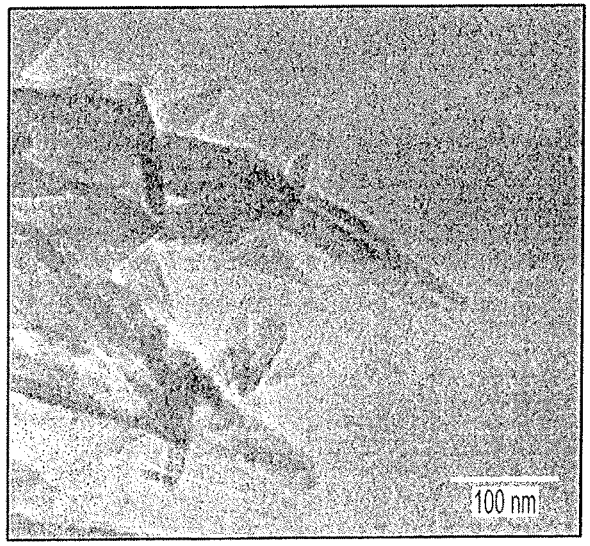
FIG. 6A shows Transmission electron microscope (TEM) images of calcium phosphate nanostructures.
Figure 6B:
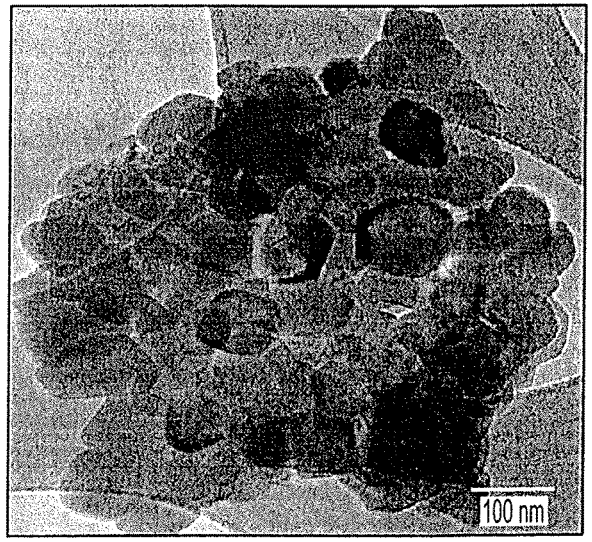
FIG. 6B shows Transmission electron microscope (TEM) images of iron phosphate nanostructures.
Figure 6C:
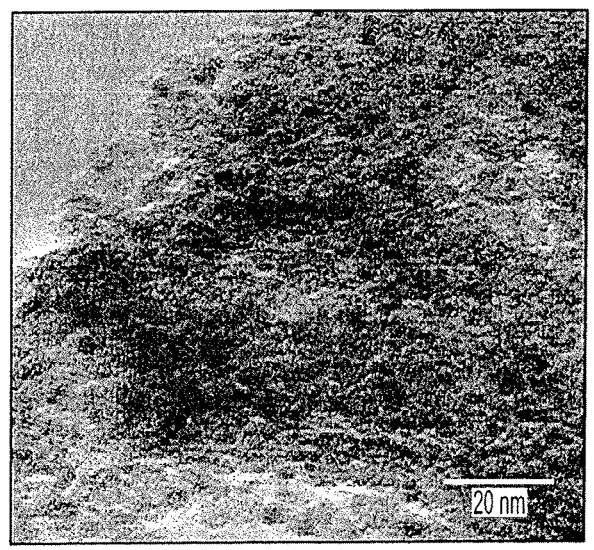
FIG. 6C shows Transmission electron microscope (TEM) images of zinc phosphate nanostructures.

FIGS. 6A, 6B, and 6C show TEM images of the morphology and diameter of the prepared mineral phosphate nanostructures. FIG. 6A shows the TEM of the synthesized calcium phosphate nanostructures which clearly indicates materials having a width of 5-10 nm, a length of 50-100 nm, and a rod-like shape. FIG. 6B shows a TEM image of iron phosphate nanostructures which were spherical with a diameter of 75 nm-100 nm. The TEM image also shows that the synthesized iron phosphate particles agglomerated. FIG. 6C shows a TEM image of synthesized zinc phosphate nanostructures having a spherical shape with a diameter of 5 nm-20 nm, and substantially in a cluster form. Overall, the TEM analysis results suggested that the synthesized nanostructures are in the nanoscale range.

It is to be understood that the fortified date product is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of preparing a fortified date fruit sugar product, comprising:
    deriving a date fruit sugar syrup from date fruits;
    preparing mineral phosphate nanostructures, the mineral phosphate nanostructures including at least one of calcium phosphate nanostructures, zinc phosphate nanostructures, and iron phosphate nanostructures, wherein the step of preparing mineral phosphate nanostructures comprises:
        i) adding a disodium phosphate solution dropwise to a mineral chloride solution under constant stirring conditions to form a mineral phosphate mixture, wherein the mineral chloride includes at least one of calcium, zinc, and iron chloride;
        ii) keeping the mixture in an autoclave at 120° C. for 2 hours to form a reaction mixture; and
        iii) centrifuging the reaction mixture to obtain a mineral phosphate nanostructure, wherein the calcium phosphate nanostructures are rod shaped and have a width of 5-10 nm, and a length of 50 nm to 100 nm, the zinc phosphate nanostructures are spherically shaped with a diameter of 5-20 nm, and the iron phosphate nanostructures are spherically shaped with a diameter of 75-100 nm;
    mixing the date fruit sugar syrup with the mineral phosphate nanostructures to provide a mixture;
    heating the mixture at 105° C. to provide a heated mixture; and
    drying the heated mixture to provide the fortified date fruit sugar product.

2. The method of claim 1, wherein the step of deriving the date fruit sugar syrup from date fruits comprises:
    adding water to a quantity of date fruits;
    crushing the date fruits in the water to provide a crushed date fruit solution;
    sonicating the date fruit solution; and
    and filtering the sonicated date fruit solution to obtain a date fruit sugar syrup.

* * * * *